(12) United States Patent
Graceffo et al.

(10) Patent No.: US 10,571,774 B2
(45) Date of Patent: Feb. 25, 2020

(54) DEMODULATION OF PHASE MODULATED SIGNALS USING THRESHOLD DETECTION

(71) Applicant: RAYTHEON COMPANY, Waltham, MA (US)

(72) Inventors: Gary M. Graceffo, Burke, VA (US); Andrew Kowalevicz, Arlington, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/296,481

(22) Filed: Mar. 8, 2019

(65) Prior Publication Data

US 2019/0280780 A1  Sep. 12, 2019

Related U.S. Application Data

(60) Provisional application No. 62/640,830, filed on Mar. 9, 2018.

(51) Int. Cl.
*G02F 2/00* (2006.01)
*H04B 10/67* (2013.01)
*H04B 10/69* (2013.01)

(52) U.S. Cl.
CPC .............. *G02F 2/00* (2013.01); *H04B 10/676* (2013.01); *H04B 10/697* (2013.01)

(58) Field of Classification Search
CPC ........ G02F 2/00; H04B 10/676; H04B 10/697
See application file for complete search history.

(56) References Cited

U.S. PATENT DOCUMENTS

| 8,411,351 | B2 | 4/2013 | McCallion et al. |
| 9,097,526 | B1* | 8/2015 | Sanders ............... G01C 19/721 |
| 9,973,281 | B2 | 5/2018 | Kowalevicz et al. |
| 10,177,856 | B2* | 1/2019 | Kowalevicz ........... H04B 10/67 |

(Continued)

FOREIGN PATENT DOCUMENTS

JP   H0591047 A   4/1993

OTHER PUBLICATIONS

Zhang, L. et al. "Microring-based Modulation and Demodulation of DPSK Signal" Optical Society of America, Optics Express, vol. 15, No. 18, Sep. 3, 2007.

(Continued)

*Primary Examiner* — Daniel Petkovsek
(74) *Attorney, Agent, or Firm* — Lando & Anastasi, LLP

(57) ABSTRACT

Optical receivers configured to demodulate phase modulated optical signals. In one example, an optical signal receiver includes an optical resonator configured to receive an arriving optical signal and to emit an output optical signal in response to receiving the arriving optical signal, the optical resonator being further configured to transform phase transitions corresponding to phase modulation of the arriving optical into intensity modulation of the output optical signal, an opto-electrical converter configured to convert the output optical signal into an electrical signal, a pulse detector configured to detect pulses in the electrical energy indicative of the phase transitions in the arriving optical signal, and a memory configured to record timing information associated with the pulses detected by the pulse detector.

16 Claims, 7 Drawing Sheets

(56) References Cited

U.S. PATENT DOCUMENTS

| | | |
|---|---|---|
| 10,225,020 B2 | 3/2019 | Dolgin et al. |
| 10,243,673 B2 | 3/2019 | Dolgin et al. |
| 10,374,743 B2 * | 8/2019 | Dolgin .................. H04B 10/66 |
| 2006/0013591 A1 | 1/2006 | Rohde |
| 2007/0031150 A1 | 2/2007 | Fisher et al. |
| 2008/0226300 A1 | 9/2008 | Mayer et al. |
| 2008/0240736 A1 | 10/2008 | Ji et al. |
| 2008/0266573 A1 | 10/2008 | Choi et al. |
| 2011/0097085 A1 | 4/2011 | Oda et al. |
| 2012/0121271 A1 | 5/2012 | Wood |
| 2013/0272337 A1 | 10/2013 | Tan et al. |
| 2014/0314406 A1 | 10/2014 | Zerbe et al. |
| 2016/0013870 A1 | 1/2016 | Sorin et al. |
| 2018/0054259 A1 | 2/2018 | Kowalevicz et al. |
| 2018/0091227 A1 | 3/2018 | Dolgin et al. |
| 2018/0091228 A1 | 3/2018 | Kowalevicz et al. |
| 2018/0091230 A1 | 3/2018 | Dolgin et al. |
| 2018/0091232 A1 | 3/2018 | Dolgin et al. |
| 2018/0102853 A1 | 4/2018 | Dolgin et al. |
| 2018/0145764 A1 | 5/2018 | Dolgin et al. |
| 2018/0145765 A1 | 5/2018 | Kowalevicz et al. |
| 2018/0167145 A1 | 6/2018 | Dolgin et al. |
| 2018/0234231 A1 | 8/2018 | Dolgin et al. |
| 2018/0367223 A1 | 12/2018 | Graceffo et al. |
| 2019/0007091 A1 | 1/2019 | Graceffo et al. |
| 2019/0158208 A1 | 5/2019 | Dolgin et al. |

OTHER PUBLICATIONS

Arimoto et al., "High-speed free-space laser communication", Performance and Management of Complex Communications Networks, 1998, pp. 175-190.

Wright et al., "Adaptive optics correction into single mode fiber for a low Earth orbiting space to ground optical communication link using the OPALs downlink", Optics Express, vol. 23, Dec. 2015, pp. 1-8.

Andrews et al., "Final Report: Channel Characterization for Free-Space Optical Communications, Phase 0 testing at Hollister, CA, Phase 2 Final Testing at China Lake, CA", Jul. 2012, pp. 1-60. Retrieved from <URL: http://www.dtic.mil/cgi-bin/GetTRDoc?Location=U2&doc=GetTRDoc.pdf&Ad=ADA565323> and accessed on Nov. 17, 2017.

Juarez et al., "High-sensitivity DPSK receiver for high-bandwidth free-space optical communication links", Optics Express, vol. 19, May 2011, pp. 1-8.

International Search Report and Written Opinion for application No. PCT/US2017/053667 dated Dec. 15, 2017.

Fang et al., "Multi-channel Silicon Photonic Receiver Based on Ring-resonators", Optics Express, vol. 18, No. 13, pp. 13510-13515, Jun. 21, 2010.

Xu et al., "Optical Differential-Phase-Shift-Keying Demodulation Using a Silicon Microring Resonator", IEEE Photonics Technology Letters, vol. 21, pp. 295-297, No. 5, Mar. 1, 2009.

* cited by examiner

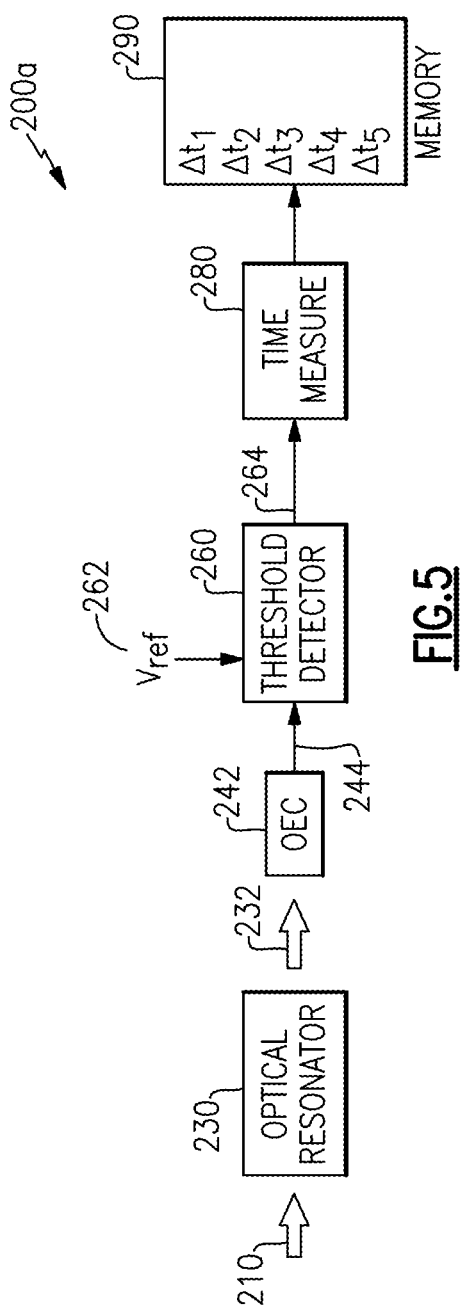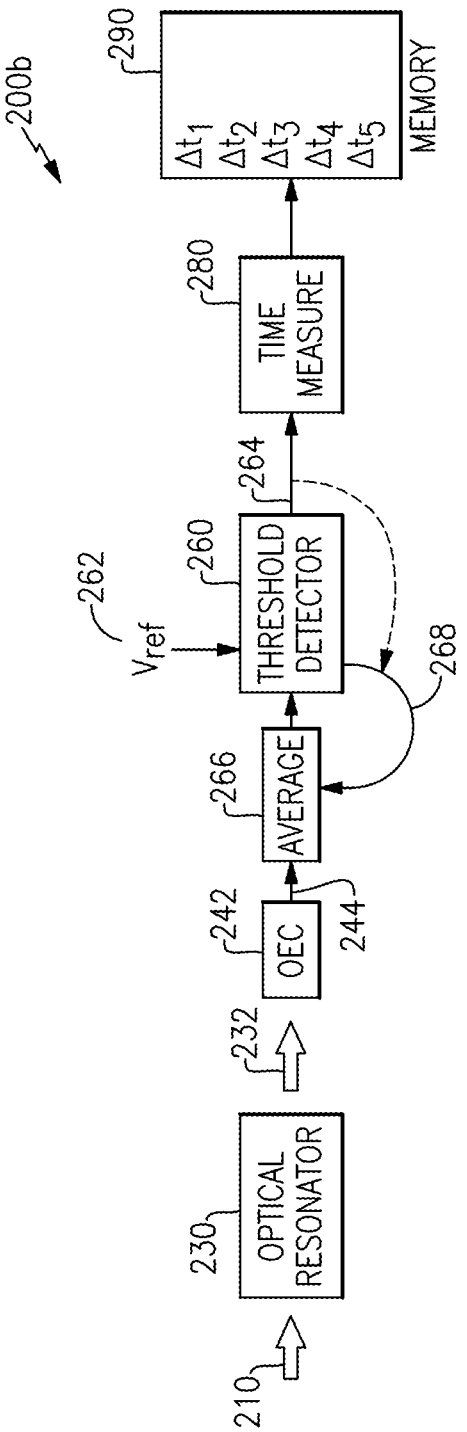

DEMODULATION OF PHASE MODULATED SIGNALS USING THRESHOLD DETECTION

CROSS-REFERENCE TO RELATED APPLICATIONS

This application claims the benefits under 35 U.S.C. § 119(e) and PCT Article 8 of U.S. Provisional Application No. 62/640,830 filed on Mar. 9, 2018, which is herein incorporated by reference in its entirety for all purposes.

BACKGROUND

Optical signals may be made to carry information by modulating a light source, often a laser source, to change various properties of the light, such as its amplitude, phase, frequency, wavelength, etc. The light waves may be in the visible spectral band, the infrared spectral band, or another region of the electromagnetic spectrum. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, such as the amplitude, phase transitions, and the like, from which the underlying signal and the information may be recovered.

Various light signals may include phase modulation, as well as amplitude or other modulation, that may encode information such as transmitted communication data, or may include other information such as information about the source of the optical signal, information about the optical channel through which the optical signal traveled, information about interaction of the optical signal with an object, and/or information about one or more objects with which the optical signal interacted. Receivers capable of demodulating phase modulation can be highly complex, requiring precision optics, local oscillators, gratings (such as Fiber Bragg Gratings), and/or delay line interferometers (DLI), etc.

SUMMARY OF THE INVENTION

Aspects and examples are directed to systems and methods for demodulation of phase encoded optical signals using an optical resonator and pulse detector.

According to one embodiment, an optical signal receiver comprises an optical resonator configured to receive an arriving optical signal and to emit an output optical signal in response to receiving the arriving optical signal, the optical resonator being further configured to transform phase transitions corresponding to phase modulation of the arriving optical into intensity modulation of the output optical signal, an opto-electrical converter configured to convert the output optical signal into an electrical signal, a pulse detector configured to detect pulses in the electrical energy indicative of the phase transitions in the arriving optical signal, and a memory configured to record timing information associated with the pulses detected by the pulse detector.

In one example, the pulse detector is configured to detect the pulses based upon transient peaks in the output optical signal.

In another example, the pulse detector is further configured to detect the pulses in the electrical signal by comparing a voltage of the electrical signal to a first threshold voltage. In one example, the pulses include at least a first pulse having a first magnitude and a second pulse having a second magnitude, the first and second pulses corresponding to phase transitions of different amounts in the arriving optical signal, and wherein the pulse detector is further configured to differentiate the first pulse from the second pulse by further comparing the voltage of the electrical signal to a second threshold voltage different from the first threshold voltage. The optical signal receiver may further include a time measurement module. In one example, the pulse detector is further configured to provide a trigger signal to the time measurement module in response to detecting each pulse, and wherein the time measurement module is configured to control the memory to record the timing information in response to receiving the trigger signal. The optical signal receiver may further comprise a processor configured to determine information encoded in the phase modulation of the arriving optical signal by processing the timing information. In one example, the optical signal receiver further comprise a smoothing component configured to smooth the electrical signal to provide a smoothed electrical signal, and the pulse detector is configured to detect the pulses in the electrical signal by detecting that the smoothed electrical signal exceeds the first threshold voltage. In another example, the pulse detector includes an analog comparator.

In one example, the optical resonator is a Fabry-Perot etalon.

In another example, the opto-electrical converter includes a photodiode.

In another example, the phase modulation of the arriving optical signal is binary phase shift keying, and wherein each of the pulses has a same magnitude.

According to another embodiment, an optical signal receiver comprises an optical resonator configured to receive a phase-modulated arriving optical signal and to emit an intensity-modulated output optical signal in response to receiving the arriving optical signal, intensity modulation of the output optical signal being representative of phase-modulation of the arriving optical signal, an opto-electrical converter configured to convert the output optical signal into an electrical signal, a threshold detector configured to detect a first pulse in the electrical signal indicative of a phase transition in the arriving optical signal and to provide a first trigger signal in response to detecting the first pulse, and a processor including a time measurement component and a memory, the time measurement component being configured to control the memory to record timing data associated with the first pulse in response to receiving the first trigger signal.

In one example, the opto-electrical converter includes a photodiode.

In another example, the optical resonator includes a Fabry-Perot etalon.

In one example, the threshold detector includes an analog comparator, and wherein the threshold detector is configured to detect the first pulse by comparing a voltage of the electrical signal to a first threshold voltage. In another example, the first pulse has a first magnitude, and wherein the threshold detector is further configured to detect a second pulse having a second magnitude different from the first magnitude by comparing the voltage of the electrical signal to a second threshold voltage different from the first threshold voltage and to provide a second trigger signal in response to detecting the second pulse.

Still other aspects, examples, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures:

FIG. 5 is a block diagram of another optical receiver according to various examples;

FIG. 6 is a block diagram of another optical receiver according to various examples;

DETAILED DESCRIPTION

Figure 1C:
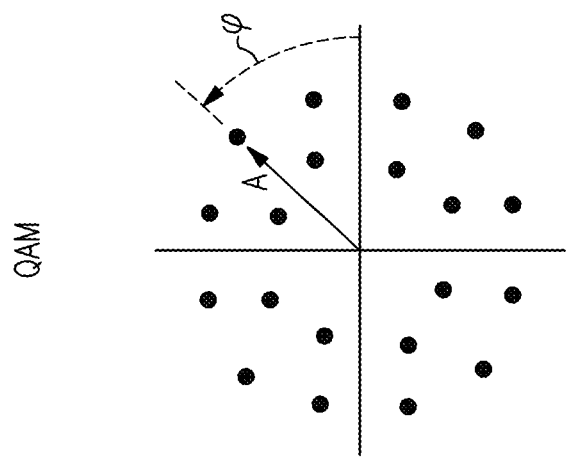
FIGS. 1A-1C are schematic diagrams of phase constellations for various modulation schemes.

Aspects and examples described herein provide systems and methods for demodulation of phase encoded optical signals. In particular, certain examples of the system include a receiver having an optical resonator, such as a Fabry-Perot filter/resonator, micro-ring, or other resonator, for converting phase encoded optical signals into one or more intensity encoded optical signals. The intensity encoded optical signals may be easily converted to electrical signals (e.g., by an opto-electrical converter, such as a photodiode), and processed to determine phase variations in the received optical signal, at lower cost and complexity of the receiving system than conventional approaches.

Aspects and examples described herein include a pulse detector, such as a threshold detector, to process the electrical signal to detect pulses (e.g., transients, disturbances) caused by phase transitions in the received optical signal. Detecting the timing and amplitude (optional) of such pulses may allow recovery of phase modulation information about the received optical signal. In some embodiments, detection of the pulses, e.g., via a threshold detector, may generate a trigger to record or store timing information about the pulse.

Various aspects and embodiments may allow recovery of phase modulation information without requiring high rate sampling and/or complex processing of the electrical signal, thus reducing the complexity and cost of a receiving system.

Various aspects and embodiments are directed to improved systems and methods for demodulation of coherent phase encoded (i.e., phase modulated) optical signals, which may also have other modulations (e.g., amplitude modulation) in some cases. In certain examples, the system includes one or more optical resonators, such as Fabry-Perot filter/resonators, fiberoptic loops, or fiberoptic micro-rings, which convert received phase transitions of an optical signal into intensity variations at an optical output. Accordingly, analysis of the intensity variations from an optical resonator may allow determination of various phase transitions of a received optical signal, and thereby demodulate the received optical signal.

Variation of output intensity from an optical resonator may depend on three parameters: changes in the arriving optical signal (e.g., phase, amplitude), optical length of the resonator (Fabry-Perot etalon, micro-ring), and a combination of absorption, reflection, and other secondary characteristics of the optical resonator. Certain embodiments may include various optical resonators, such as etalons. In particular, according to certain embodiments, one or more etalons may have an effective (roundtrip) length equal to an integer number of wavelengths of the transmission beam light (the etalon is tuned), or may be out of tune with the received light, in various examples. Whatever etalon or optical resonator is used, the response of the optical resonator to phase transitions in the arriving optical signal may be characterized (e.g., may be known) such that detection of various intensity variations at the output of the optical resonator may allow determination of, and therefore demodulation of, the phase transitions that occurred in the arriving optical signal. In various embodiments, the output optical signal from the optical resonator may be converted to an electrical signal, and the amplitude variations of the electrical signal are thereby indicative of response of the optical resonator.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

In various embodiments, systems and methods are based on an optical resonator that provides an output optical signal having intensity variations representative of phase transitions in a received optical signal. Various optical resonators may be tuned to or detuned from the arriving optical signal, and may exhibit varying output signal transitions in response thereto, without departing from the aspects and embodiments described herein. In various embodiments, an optical resonator does not have to be tuned to a precise transmission rate or a precise optical wavelength.

Figure 1B:
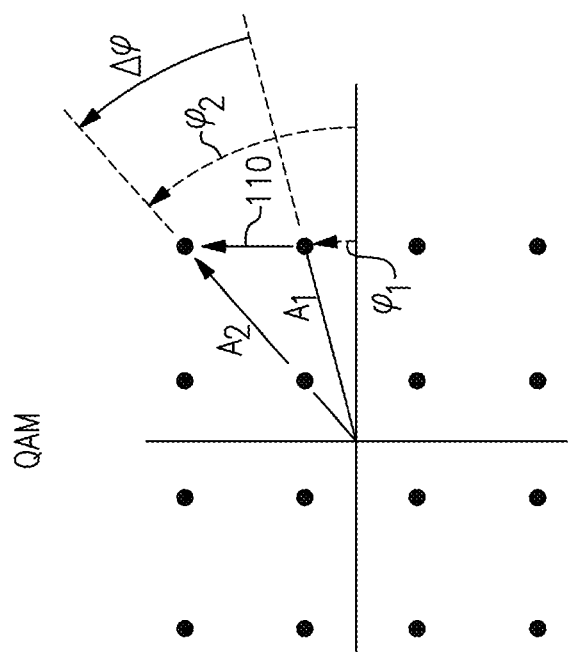
Figure 1A:
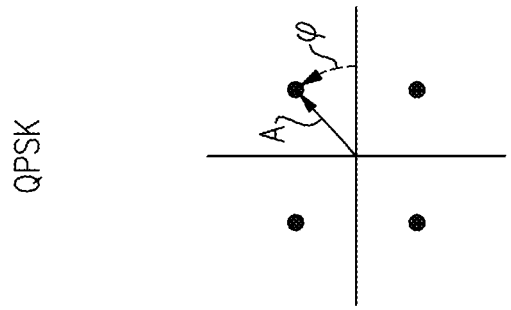

FIGS. 1A-1C illustrate examples of signal constellations for various modulation schemes, including QPSK (FIG. 1A) and QAM (FIGS. 1B-1C). The constellations shown, as well as lower and higher order constellations of M-PSK and QAM, may be accommodated, detected, and demodulated, at least in part, by the systems and methods described herein. Each point on each constellation represents an optical signal having a certain amplitude, A, and phase, $\Phi$. A transition from one point to another point on each constellation may include a change in amplitude, a change in phase, or both. For example, the modulation transition 110 includes a change in amplitude of $\Delta A = A_2 - A_1$ and a change in phase of $\Delta \varphi = \varphi_2 - \varphi_1$. A receiver that tracks changes in amplitude and phase may also thereby track absolute amplitude and phase of a received optical signal, with reference to an arbitrary starting phase, for instance.

Any phase or amplitude shift may cause a variation in the output signal of an optical resonator. For example, a phase shift may cause a transient disturbance while an amplitude shift may cause the output signal to settle at a new output intensity level. A particular phase shift may cause a greater disturbance to the output signal than caused by a phase shift of lower magnitude, e.g., a greater phase shift may cause a greater disturbance than a smaller phase shift. Further, a phase shift in one direction may cause a greater disturbance in a particular resonator than a phase shift of the same magnitude in an opposite direction, e.g., a positive phase shift versus a negative phase shift may cause different disturbances in an optical resonator.

A wavelength that does not create a resonant response in an optical resonator nonetheless establishes an output optical signal. Under such a condition, the optical resonator may be described as being untuned, or detuned, from the particular wavelength. A phase transition arriving at a detuned optical resonator causes a disturbance to the output signal, despite the lack of resonance. Additionally, an amplitude change arriving at a detuned optical resonator causes a change in the steady-state output signal level. Accordingly, phase and amplitude changes in an optical signal that arrive at either of a tuned or a detuned optical resonator may vary the intensity of an output signal from the optical resonator. Such variations in output intensity may be detected and interpreted to determine the phase and amplitude changes in the arriving optical signal, thereby demodulating the arriving optical signal.

Figure 2:
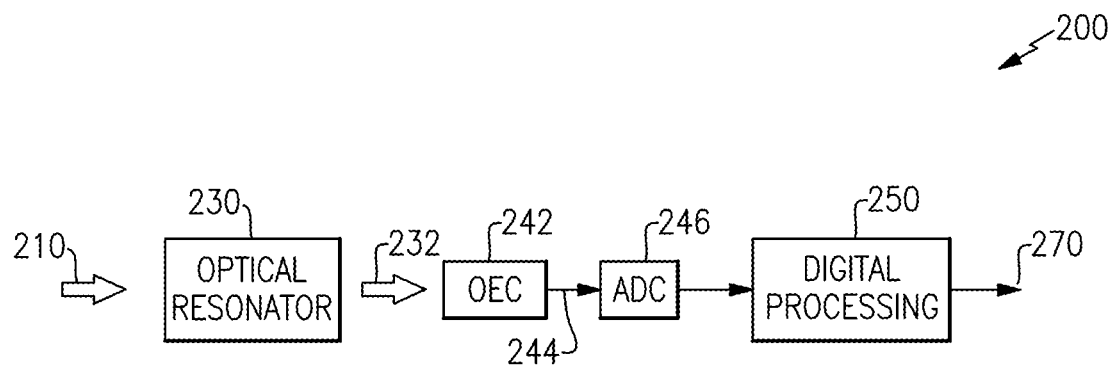
FIG. 2 is a block diagram of an optical receiver according to various examples.

Referring to FIG. 2, illustrated is an example of an optical receiver 200 according to various examples discussed herein. The illustrated receiver 200 receives an optical signal 210 and includes an optical resonator 230 and a digital processing subsystem 250 that provides an output 270. The optical resonator 230 may be coupled to the digital processing subsystem 250 by an optical-electrical converter 242 that provides an electrical signal 244 to an analog to digital converter 246, for example.

Examples of optical resonators 230 may include Fabry-Perot etalons, micro-rings, or other types of resonators. The optical resonator 230 is a component capable of sensing transitions, such as phase transitions, representative of modulation of the received optical signal 210, and transforming the transitions into intensity modulation of an output optical signal, e.g., output optical signal 232. The optical resonator 230 converts the modulation of the arriving optical signal 210 in part by interaction of the arriving optical signal 210 with optical signal energy built-up or held in the optical resonator 230.

An optical signal received by an optical resonator 230 may establish a steady-state energy-conserving condition in which optical signal energy continuously arrives at the resonator, accumulates or adds to built-up energy existing inside the resonator, and emerges from the resonator at a constant rate. A change in the arriving phase, frequency, or amplitude of the optical signal may disrupt the steady-state condition, and the light intensity emerging from the resonator is thereby disrupted, until a steady state condition is re-established. Accordingly, a change in phase, frequency, or amplitude of the arriving optical signal 210 causes a change in intensity of the emerging optical signal 232. A large phase transition in the arriving optical signal 210, for example, causes a large (but temporary) intensity change in the emerging optical signal 232. Similar operation occurs in an etalon, optical loop, micro-ring, or other optical resonator. Accordingly an optical resonator 230 functions as a demodulator, or a modulation converter, for an optical signal 210. The emerging optical signal 232 may therefore carry the same information content as the arriving optical signal 210, but in intensity modulated form.

The emerging intensity-modulated optical signal 232 may be converted to an electrical signal by an optical-electrical converter, e.g., OEC 242, which may include a photodetector, such as a photodiode, for example. Accordingly, the output of the OEC 242 may be an amplitude modulated electrical signal 244 representative of the intensity-modulated optical signal 232, and may be converted to a digital form by an analog to digital converter, e.g., ADC 246. The digital signal is provided to the digital processing subsystem 250 for digital processing. The digital processing subsystem 250 processes the digital signal to retrieve the information-carrying content of the optical signal 210.

When a system such as the optical receiver 200 does not have a synchronous timing reference to clock the ADC 246, asynchronous clocking may be used. When clocking is asynchronous, the frequency and phase relationships between the ADC clock and a symbol rate may be uncertain and subject to drift. Over sampling may be used in some cases to compensate for this asynchronous relationship, e.g., not having the ability to synchronize the ADC clock with the symbol rate. When asynchronously sampling a signal, the selected sampling rate and resolution must be high enough to ensure that amplitude changes in the signal are neither missed nor only partially detected. Ideally, the sample rate is selected to ensure that the full extent (either positive or negative relative to the stead state) of each amplitude change is captured, because failure to distinguish the amplitude changes may result in symbol errors and possible loss of data. Accordingly, over sampling may be used in various instances. Over sampling by a factor of N creates N times as many samples to process and store, making such a system more complex and expensive. Various aspects and embodiments of optical receivers discussed in more detail below, with respect to FIGS. 5-10 provide alternatives to oversampling asynchronous systems.

Figure 3:
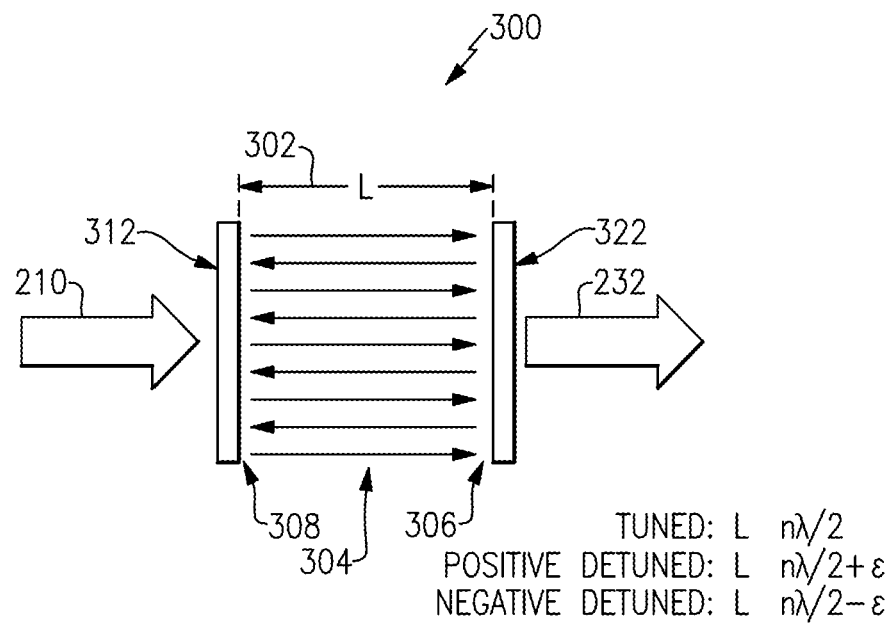
FIG. 3 is a schematic diagram of an example of an optical resonator.

As discussed above, suitable optical resonators may include etalons, micro-rings, or other structures. Some detail of at least one example of an etalon is discussed with respect to FIG. 3, which illustrates an example of an etalon 300 that may be used as an optical resonator 230 in accord with aspects and embodiments described herein. In particular, the etalon 300 may be used to convert phase and/or amplitude modulations of the received optical signal 210 into intensity or amplitude modulations of the output optical signal 232. The intensity or amplitude modulated output optical signal 232 may then be converted to an electrical signal 244, as discussed above. The etalon 300 exhibits output intensity variations in response to phase and/or amplitude transitions in the received optical signal 210.

The etalon 300 includes an interior 304 with semi-reflective surfaces 306, 308 that reflect optical signal energy into the interior 304. An input side 312 allows optical signal energy, such as the optical signal 210, into the interior 304. The input side 312 thereby forms an aperture through which the arriving optical signal 210 is received. An output side 322 forms an optical output, at least in part by action of the semi-reflective surface 306 to allow a portion of trapped optical signal energy from the interior 304 to emerge as an output optical signal, such as the output optical signal 232. Accordingly, the semi-reflective surface 306 is also semi-transmissive, such that optical signal energy arriving (from the interior 304) at the semi-reflective surface 306 is partially reflected back to the interior 304 and partially transmitted through to the output side 322. The etalon 300 may have varying levels of reflectivity of the semi-reflective surfaces 306, 308. In certain examples, the reflectivity may be expressed as a fraction of light amplitude reflected back into the interior 304, or may be expressed as a fraction of light intensity reflected back into the interior 304. The etalon 300 is one example of a suitable optical resonator in accord with aspects and embodiments described herein.

Use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like.

In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples.

In various embodiments, an optical loop or a micro-ring may also be a suitable optical resonator, formed of one or more waveguides in which at least one is a closed loop such that optical signal energy traversing "around" the loop may be phase aligned with a dimension of the loop at one or more wavelengths. Accordingly, optical signal energy traversing the loop may constructively or destructively interfere with itself, at certain frequencies (wavelengths), and such constructive or destructive interaction may be disturbed by a phase change in an arriving optical signal.

According to certain examples, an optical resonator, such as the etalon 300, will develop a steady-state output signal based on the input signal, and maintain a given level of the output signal until a modulation of the input signal occurs. When a phase modulation occurs in the input signal, self-interference (constructive or destructive) may cause a phase-dependent transient disturbance in the intensity of the output signal. Such a transient disturbance may depend upon the tuning of the etalon (or other optical resonator). Accordingly, an etalon 300 may have various states of tuning, relative to a received optical signal wavelength, k. For example, a tuned etalon may have an optical interior dimension 302 that is an integer number of half-wavelengths, e.g., $L=n\lambda/2$. A detuned etalon may be positively detuned by having a slightly larger dimension, e.g., $L=n\lambda/2+\varepsilon$, or be negatively detuned by having a slightly smaller dimension, e.g., $L=n\lambda/2-\varepsilon$. In some embodiments, the dimensional variant, $\varepsilon$, may have a nominal value of one eighth wavelength, e.g., $\varepsilon=\lambda/8$. In other embodiments, the dimensional variant may have a nominal value of a tenth of a wavelength, e.g., $\varepsilon=\lambda/10$, or a twelfth of a wavelength, $\varepsilon=\lambda/12$. In some embodiments, the effect of detuning may be to cause more or less responsiveness, e.g., by the etalon 300, to phase advances versus phase retreats and/or responsiveness to larger phase transitions versus smaller transitions. Various etalons or other optical resonators may be designed to have various desired responses to phase transitions in an arriving optical signal of various wavelengths and/or angles of incidence, for example. Accordingly, other embodiments may have different nominal dimensional variants, c, and any dimensional variant, c, may be more or less precise in various embodiments. Additionally, a positively detuned optical resonator with respect to a particular wavelength may be a negatively detuned optical resonator with respect to another wavelength. In some embodiments, positively and negatively detuned resonator dimensions may be equivalently described with respect to two optical resonators as being detuned by $2\varepsilon$ relative to each other, without regard to what wavelength might produce resonance in either of the optical resonators. Further details of the operation of a tuned resonator, and of detecting and demodulating phase modulations using various tuned and/or detuned resonators, may be found in co-pending U.S. patent application Ser. No. 15/725,457 filed on Oct. 5, 2017, titled SYSTEMS AND METHODS FOR DEMODULATION OF PSK MODULATED OPTICAL SIGNALS, and in co-pending U.S. patent application Ser. No. 15/816,047 filed on Nov. 17, 2017, titled DEMODULATION OF QAM MODULATED OPTICAL BEAM USING FABRY-PEROT ETALONS AND MIRRORING DEMODULATORS, each of which is incorporated herein by reference in its entirety for all purposes.

Figure 4:
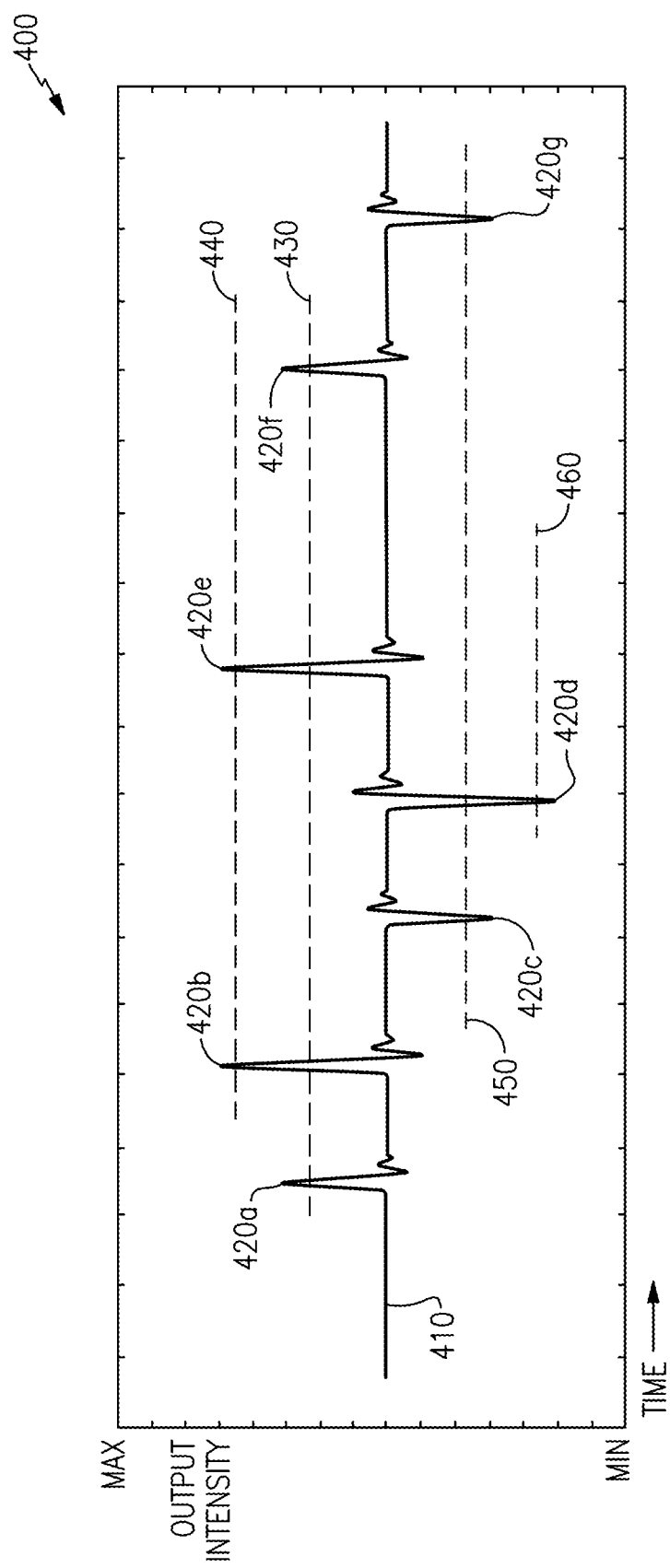
FIG. 4 is an output waveform from which pulses may be detected according to various examples.

FIG. 4 illustrates an example of an output intensity waveform 400 from an optical resonator in response to various phase transitions in a received optical signal. For example, the optical resonator may have a steady-state output level 410 that is maintained while receiving an arriving optical signal substantially without disruption, and a number of pulses 420 (e.g., transient disturbances) caused by phase transitions in the arriving optical signal. Various pulses 420 may be of greater or lesser magnitude, and in general may be positive or negative pulses, which may depend upon the design of the optical resonator, the wavelength and incident angle of the arriving optical signal, the phase transition (e.g., direction and magnitude) that causes the pulse 420 and/or additional factors. For example, a larger change in phase may cause a pulse 420b to be greater in magnitude than a pulse 420a caused by a smaller change in phase. Additionally, a phase change in one direction may cause a positive pulse 420a while a phase change in another direction may cause a negative pulse 420c. The various magnitudes and directions of pulses 420 may depend upon the expected phase transitions in the arriving optical signal, e.g., the phase encoded information may be represented by a discrete set of possible phase transitions, such that a pulse magnitude and direction indicates which phase transition occurred.

For example, a differential binary phase shift keyed (DBPSK) signal may have only 180-degree phase transitions in the arriving optical signal (potentially with some variation due to the optical channel or other effects) and in such a system each pulse 420 may be substantially identical, e.g., a positive pulse of a certain magnitude. Accordingly, detection that a pulse 420 occurred indicates that a 180-degree phase transition occurred in the arriving optical signal, and thus allows recovery of information encoded in the phase transitions. Systems and methods in accord with aspects and embodiments described herein detect such pulses (e.g., with threshold detection) and may record the timing of the pulses, such that the sequence of phase transitions in an arriving optical signal may be demodulated. For example, a first threshold 430 may be sufficient to detect each positive pulse 420a, 420b, 420e, 420f, caused by a DBPSK signal. It should be understood that in such a binary phase shift example, no negative pulses may be present, e.g., the pulses 420c, 420d, 420g do not occur. Accordingly, there may be no need to detect or distinguish negative pulses nor to detect or distinguish pulses of varying magnitude.

An arriving optical signal having higher-order phase modulation, such as quadrature phase shift keying (QPSK) may have phase transitions of 180-degrees or 90-degrees, and a phase transition may occur in either of a positive or a negative direction, in some examples. Depending upon various factors, such as the tuning of the optical resonator as discussed above, each possible phase transition in a QPSK example may cause a pulse 420 having differing magnitude and/or direction. Accordingly, in various embodiments, a second threshold 440 may be applied to distinguish the larger pulses 420b, 420e from the smaller pulses 420a, 420f. Similarly, negative thresholds 450, 460 may be applied to detect and distinguish negative pulses in some embodiments.

FIG. 5 illustrates an example of an optical receiver 200a that includes a threshold detector 260. The threshold detector receives an electrical signal 244 from the OEC 242, which may include pulses, e.g., pulses 420, indicative of phase transitions in the arriving optical signal 210. The threshold detector 260 may include a reference voltage 262 for making comparison with the output of the OEC 242, to detect the pulses. When a pulse is detected, the threshold detector 260 may indicate detection of the pulse (e.g., detection that the OEC 242 output exceeded a threshold voltage, such as the first threshold 430) by providing a trigger signal 264, causing time measurement 280 to store timing data in a memory 290. In various examples, timing data may be any type of timing data. For example, timing data may be delta times, $\Delta t_1$, $\Delta t_2$, $\Delta t_3$, $\Delta t_4$, e.g., between pulses, or may be a timestamp, or other forms of timing data, in various embodiments, or a combination of these. The timing data of the pulses correspond to the timing of phase transitions in the arriving optical signal 210, which in turn are indicative of phase encoded information conveyed by the arriving optical signal 210. Accordingly, the phase encoded information may be recovered from the timing data of the pulses. In various embodiments, the threshold detector 260 may make voltage comparisons, current comparisons, energy comparisons, or any combination of these or other quantifiable comparisons to detect a pulse. Additionally, various embodiments may include other forms of pulse detection instead of or in addition to detection based upon comparison of a quantity to a threshold.

In some embodiments, the output electrical signal 244 from the OEC 242 may be amplified, integrated, averaged, or otherwise processed or smoothed before being provided to the threshold detector 260. With reference to a further example of an optical receiver 200b as shown in FIG. 6, a smoothing component 266 may provide to the threshold detector 260 a signal representative of a running average of the output of the OEC 242. In various embodiments, the smoothing component 266 may include an integrating component and/or may include other forms of signal smoothing, e.g., to reduce a number of false positives or erroneous pulse detections. In some embodiments, the threshold detector 260 (or more generally, pulse detector) may provide a reset signal 268 to the smoothing component 266, which may optionally be the same trigger signal 264 that indicates a pulse has been detected. The reset signal 268 may cause the smoothing component 266 to reset or restart its functionality, such as zeroing an integrated value or restarting a running average, for example, in various embodiments.

Figure 7:
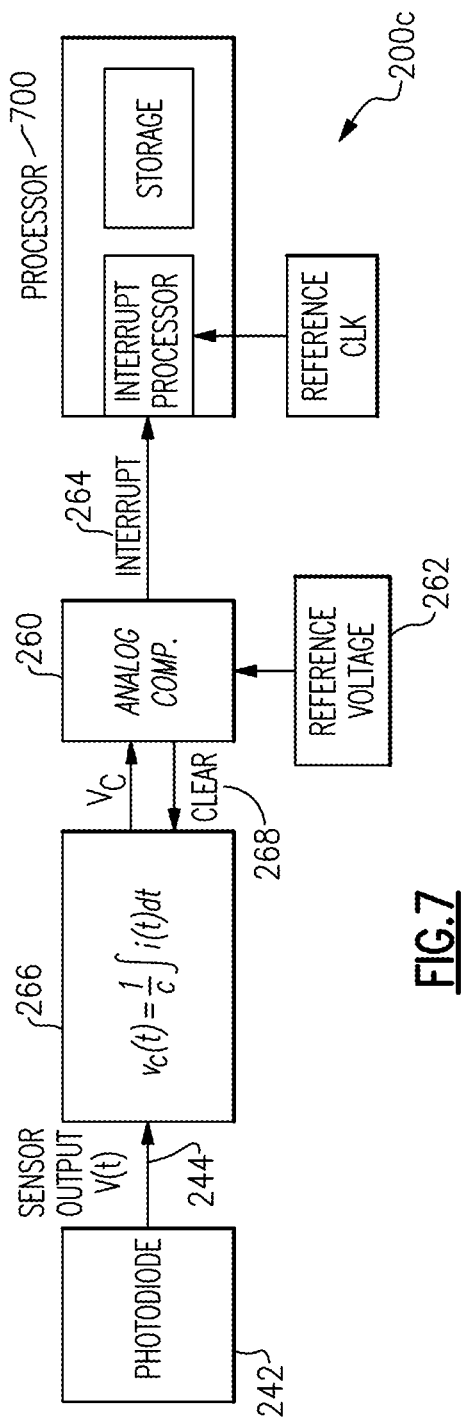
FIG. 7 is a block diagram of another optical receiver according to various examples.

FIG. 7 illustrates a further example of an optical receiver 200c, similar to the optical receiver 200b, where the threshold detector 260 is an analog comparator (an example of which is discussed in more detail below), and the smoothing component 266 is a voltage integrator. A processor 700 receives the trigger signal 264, referenced as an interrupt signal in FIG. 7, and performs various processing based upon the interrupt, e.g., stores the timing of the interrupt, which corresponds to the timing of a phase transition in an arriving optical signal.

Figure 8:
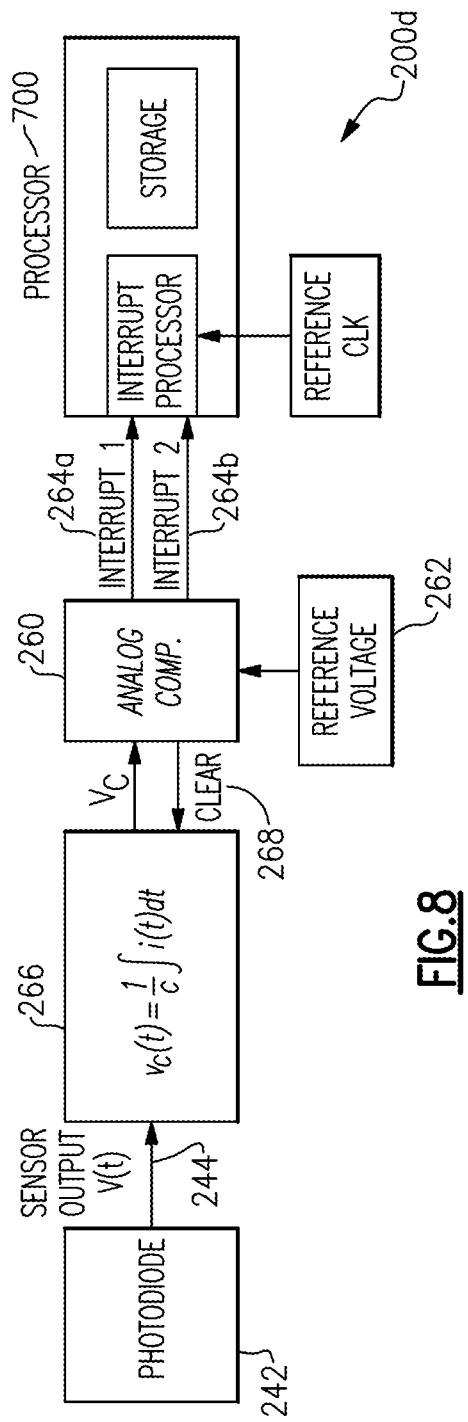
FIG. 8 is a block diagram of another optical receiver according to various examples.

FIG. 8 illustrates a further example of an optical receiver 200d, similar to the optical receiver 200c, that accommodates detection and distinction of more than one pulse characteristic. The threshold detector 260 is an analog comparator that includes accommodation to detect two distinct pulses of differing magnitude, or differing direction (e.g., positive or negative), or a combination of the two, and provides a first trigger signal 264a to indicate a pulse of a first magnitude is detected and a second trigger signal 264b to indicate a pulse of a second magnitude (or direction) is detected. Accordingly, the first trigger signal 264a indicates that a first type of pulse occurred and the second trigger signal 264b indicates that a second type of pulse occurred. Additional trigger signals may be provided in various embodiments to indicate additional types of pulses. Each distinct type of pulse may indicate that a distinct phase transition occurred in an arriving optical signal, as discussed previously. In some embodiments, the first and second trigger signals 264a, 264b may operate independently to indicate that a respective pulse type occurred, or in other embodiments the first and second trigger signals 264a, 264b may operate cooperatively, such as the first trigger signal 264a indicating that a pulse occurred and the second trigger signal 264b indicating whether it was of higher or lower magnitude, for example. In various embodiments, various types of smoothing, averaging, integrating, amplifying, and threshold or pulse detection may be provided in various manners, to detect or determine a phase transition in an arriving optical signal, to further recover information encoded in the phase of the optical signal.

Figure 9:
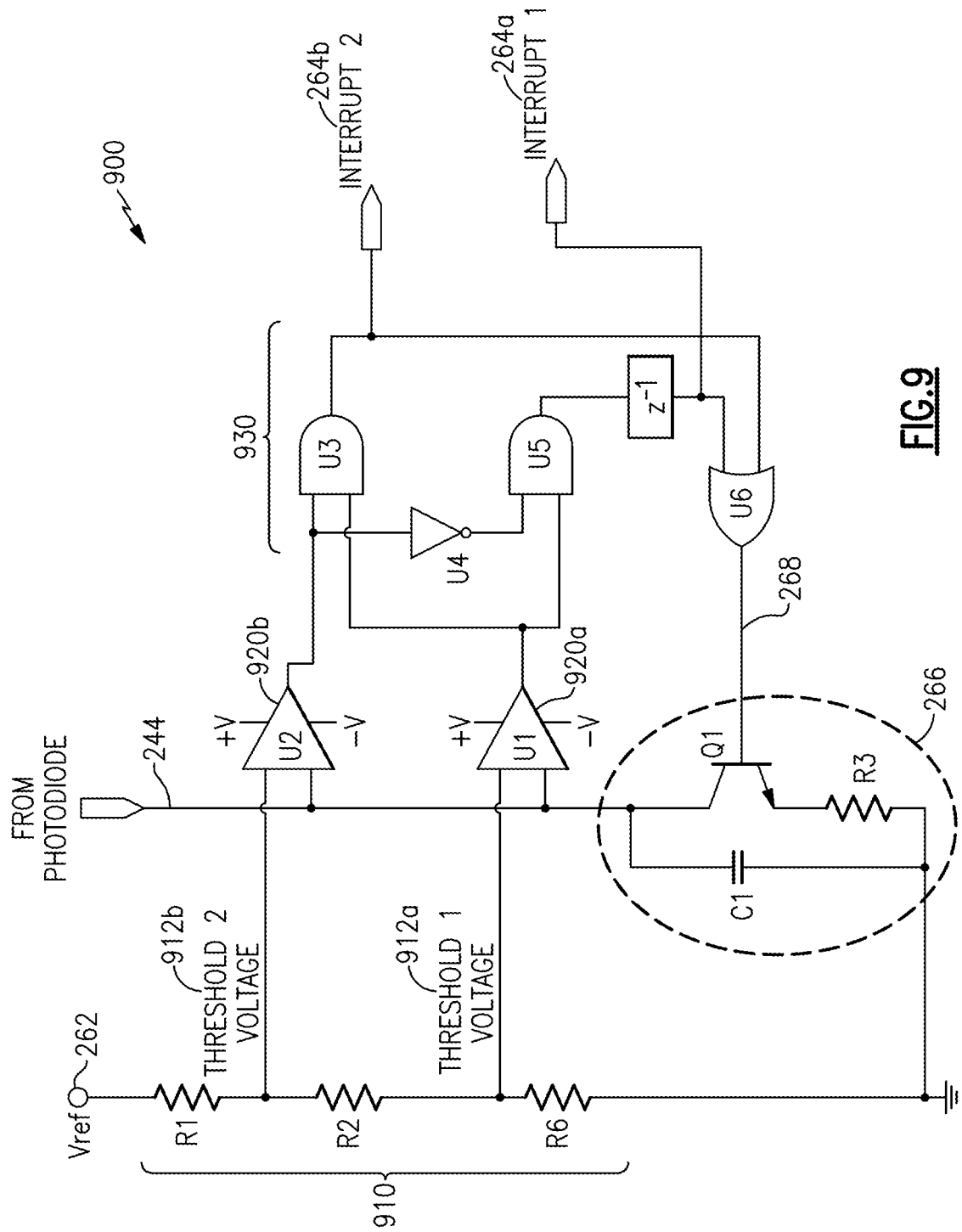
FIG. 9 is a schematic diagram of an example of a detection circuit that may be used with various examples of an optical receiver.

FIG. 9 illustrates at least one example of a circuit 900 that may perform smoothing and threshold detection on an electrical signal 244 (e.g., from OEC 242) having pulses indicative of phase transitions in an arriving optical signal. In the circuit 900, a voltage divider 910 provides two threshold voltages 912a, 912b, and a smoothing component 266 that includes a capacitor C1 that charges (and/or discharges) in response to the electrical signal 244. The smoothed electrical signal 244 is compared to each of the threshold voltages 912a, 912b, by comparators 920a, 920b, respectively, and outputs from the comparators 920 are fed to a logic circuit 930 that provides respective trigger signals 264. In this example, the trigger signal 264a is responsive to a lower threshold voltage 912a and the logic circuit 930 includes a delay ($z^{-1}$) to align with additional timing that may be necessary for the higher trigger signal 264b to be responsive to a higher pulse (in excess of the higher threshold voltage 912b). Accordingly, the lower trigger signal 264a does not erroneously indicate a "low" pulse when the electrical signal 244 is increasing up to the higher threshold voltage 912b. Additionally, the logic circuit 930 provides a reset signal 268 to the smoothing component 266, whenever either voltage threshold 912 is met, that causes the smoothing circuit to reset by discharging the capacitor C1 through a transistor Q1 and resistor R3.

Accordingly, the circuit 900 detects pulses, such as the pulses 4201, 420b, 420e, 420f of FIG. 4, and provides trigger signals 264a, 264b, that indicate the occurrence of the pulses and distinguish the pulses by magnitude. For example, the lower threshold voltage 912a may correspond with the threshold 430 of FIG. 4, and the trigger signal 264a may indicate the occurrence of the lower pulses 420a and 420f. Similarly, the higher threshold voltage 912b may correspond with the threshold 440 of FIG. 4, and the trigger signal 264b may indicate the occurrence of the higher pulses 420b and 420e.

Various embodiments may include threshold detection of a greater number of threshold voltages (and thereby pulse magnitudes) and/or may include threshold detection of negative pulses in addition to or instead of positive pulses, in similar fashion. The circuit 900 is merely an example of a threshold detection circuit that may be suitable as a threshold detector 260, but various embodiments may include other forms of threshold detectors, or pulse detectors more generally, to detect pulses representative of phase transitions in an arriving optical signal, and thereby allowing determination of information encoded by such phase transitions.

Figure 10:
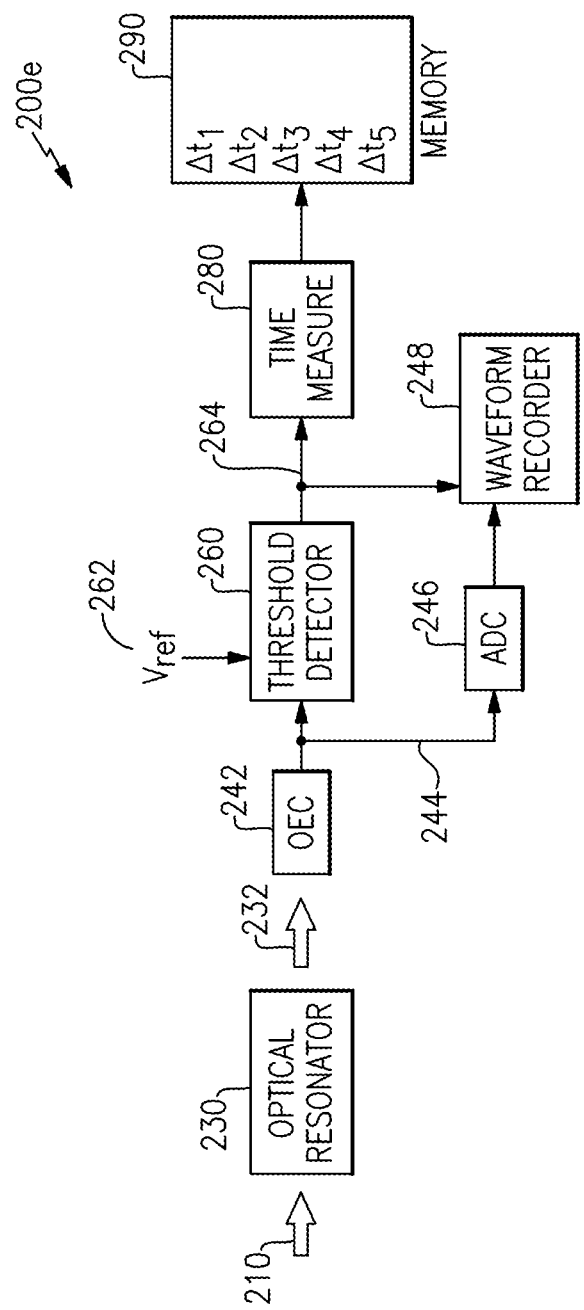
FIG. 10 is a block diagram of another optical receiver according to various examples.

FIG. 10 illustrates a further example of an optical receiver 200e, similar to a combination of the optical receiver 200 of FIG. 2 and the optical receiver 200a of FIG. 5. In the optical receiver 200e, an ADC 246 digitizes the electrical signal 244, similar to the optical receiver 200, but the digital samples are not necessarily processed or stored unless they are representative of a phase transition in the arriving optical signal. A pulse detector (e.g., the threshold detector 260) is used to indicate when a phase transition occurs, and the trigger signal 264 may then be used to trigger recording of digital samples, e.g., by a waveform recorder 248. In various embodiments, the digitized samples may be processed by a digital subsystem, similar to the digital subsystem 250 of FIG. 2, rather than being recorded. In various embodiments, the ADC 246 may be idle until the trigger signal 264 indicates that it should digitize samples of the electrical signal 244. In various embodiments, the ADC 246 may provide samples continuously, and the trigger signal 264 may cause a group of samples (e.g., a window) to be recorded or processed. Such a window may extend back a certain amount of time from the trigger signal 264 and/or may extend forward a certain amount of time from the trigger signal 264. The timing associated with a detected pulse, and therefore associated with the samples from the ADC 246, may be recorded by a time measurement 280 and memory 290, in similar fashion to those described previously, or by alternate means.

Advantages of the aspects and embodiments described herein are numerous. For example, optical components in accord with those herein may be lower cost or less complex than those required for conventional systems, such as allowing for coated or uncoated glass rather than crystal or expensive coatings. Use of optical resonators, such as etalons, for converting phase modulation into intensity modulation, may be advantageously designed to incorporate filtering (e.g., rejection of unwanted signals, via resonant dimensions, for example) which may provide improved signal-to-noise characteristics. Aspects and embodiments in accord with those described herein may satisfactorily operate in extreme aberration or turbulence in which adaptive optics would fail. Further, aspects and embodiments in accord with those described herein may achieve free-space optical communications with low size, weight, power, and cost requirements, improving support for platforms such as unmanned aerial vehicles and microsatellites.

It should be appreciated that the variation to output intensity caused by modulation of an arriving light signal may vary with resonant physical dimensions of an optical resonator, such as the dimensional length of an etalon or micro-ring, and how accurately it is manufactured, e.g., how well tuned the etalon is to one or more wavelengths. Output intensity from a tuned etalon with a smaller dimensional length is more quickly disrupted by a transition in the input signal, and more quickly re-establishes a steady state after such a transition, relative to a tuned etalon with a larger resonant dimension. Additionally, an etalon manufactured to a more accurate tolerance, i.e., more accurately tuned to the particular wavelength, may provide a higher steady-state output signal intensity and may exhibit greater sensitivity to transitions in input signals, relative to an etalon manufactured to a less accurate tolerance. Any such factors may influence the shape of pulses that result from phase transitions, but pulse detection components may be designed to accommodate varying responsive pulses as necessary.

Various embodiments may have various etalon dimensions and tolerances based upon particular design criteria and to accommodate varying operational characteristics. In some examples, various etalon dimensions and tolerances may be selected to trade off, or balance, how strongly and/or how quickly the etalon responds to transitions in an arriving optical signal, and how quickly and/or how strongly the etalon approaches a return to steady-state after a transition, thus impacting the shape of pulses in an electrical signal, e.g., the electrical signal 244. Additionally, various etalon dimensions and tolerances may be selected to optimize a receiver for a particular data rate and/or a particular wavelength.

Certain embodiments may incorporate various additional aspects or components to further provide selectivity of one light signal over another. For example, light of certain wavelengths may be preferred or rejected through the use of frequency selective filters, frequency selective coatings, and/or by selection of frequency selective dimensions or other features of an optical resonator or other resonant structures.

Optical signals may be phase and/or amplitude modulated via various sources and/or processes. Detection and determination of the phase encoding may be useful for many purposes. A coherent optical signal, such as a laser beam, may be purposefully modulated by a data communications transmitter for instance, to encode communicated information on the optical signal. Numerous processes may phase and/or amplitude modulate a coherent light source, from which information about the process may be recovered by appropriate demodulation (e.g., interpreting) of the modulated optical signal. For example, various measurement systems may transmit an optical signal and analyze a reflected signal to determine dimensions, movement, defects, etc. Examples of various systems for which demodulation of phase modulated optical signals may be beneficial include target designators, laser guidance systems, laser sight, laser scanners, 3D scanners, homing beacons and/or surveying systems, as well as communication systems. In some of these examples, an optical signal may arrive via a free space signal path (e.g., free space optical, FSO) or a fiber or other waveguide system. Systems and methods for demodulation of phase and/or amplitude modulated optical signals in accord with aspects and examples disclosed herein may be beneficially applied to any of the above-mentioned optical systems, or others, to receive, detect, recover, etc. useful information from an optical signal.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
   an optical resonator configured to receive an arriving optical signal and to emit an output optical signal in response to receiving the arriving optical signal, the optical resonator being further configured to transform phase transitions corresponding to phase modulation of the arriving optical into intensity modulation of the output optical signal;
   an opto-electrical converter configured to convert the output optical signal into an electrical signal;
   a pulse detector configured to detect pulses in the electrical energy indicative of the phase transitions in the arriving optical signal; and
   a memory configured to record timing information associated with the pulses detected by the pulse detector.

2. The optical signal receiver of claim 1 wherein the pulse detector is configured to detect the pulses based upon transient peaks in the output optical signal.

3. The optical signal receiver of claim 1 wherein the pulse detector is further configured to detect the pulses in the electrical signal by comparing a voltage of the electrical signal to a first threshold voltage.

4. The optical signal receiver of claim 3 wherein the pulses include at least a first pulse having a first magnitude and a second pulse having a second magnitude, the first and second pulses corresponding to phase transitions of different amounts in the arriving optical signal, and wherein the pulse detector is further configured to differentiate the first pulse from the second pulse by further comparing the voltage of the electrical signal to a second threshold voltage different from the first threshold voltage.

5. The optical signal receiver of claim 3 further comprising a time measurement module, wherein the pulse detector is further configured to provide a trigger signal to the time measurement module in response to detecting each pulse, and wherein the time measurement module is configured to control the memory to record the timing information in response to receiving the trigger signal.

6. The optical signal receiver of claim 5 further comprising a processor configured to determine information encoded in the phase modulation of the arriving optical signal by processing the timing information.

7. The optical signal receiver of claim 5 further comprising a smoothing component configured to smooth the electrical signal to provide a smoothed electrical signal, and the pulse detector being configured to detect the pulses in the electrical signal by detecting that the smoothed electrical signal exceeds the first threshold voltage.

8. The optical signal receiver of claim 3 wherein the pulse detector includes an analog comparator.

9. The optical signal receiver of claim 1 wherein the optical resonator is a Fabry-Perot etalon.

10. The optical signal receiver of claim 1 wherein the opto-electrical converter includes a photodiode.

11. The optical signal receiver of claim 1 wherein the phase modulation of the arriving optical signal is binary phase shift keying, and wherein each of the pulses has a same magnitude.

12. An optical signal receiver comprising:
    an optical resonator configured to receive a phase-modulated arriving optical signal and to emit an intensity-modulated output optical signal in response to receiving the arriving optical signal, intensity modulation of the output optical signal being representative of phase-modulation of the arriving optical signal;
    an opto-electrical converter configured to convert the output optical signal into an electrical signal;
    a threshold detector configured to detect a first pulse in the electrical signal indicative of a phase transition in the arriving optical signal and to provide a first trigger signal in response to detecting the first pulse; and
    a processor including a time measurement component and a memory, the time measurement component being configured to control the memory to record timing data associated with the first pulse in response to receiving the first trigger signal.

13. The optical signal receiver of claim 12 wherein the opto-electrical converter includes a photodiode.

14. The optical signal receiver of claim 12 wherein the optical resonator includes a Fabry-Perot etalon.

15. The optical signal receiver of claim 12 wherein the threshold detector includes an analog comparator, and wherein the threshold detector is configured to detect the first pulse by comparing a voltage of the electrical signal to a first threshold voltage.

16. The optical signal receiver of claim 15 wherein the first pulse has a first magnitude, and wherein the threshold detector is further configured to detect a second pulse having a second magnitude different from the first magnitude by comparing the voltage of the electrical signal to a second threshold voltage different from the first threshold voltage and to provide a second trigger signal in response to detecting the second pulse.

* * * * *

UNITED STATES PATENT AND TRADEMARK OFFICE
CERTIFICATE OF CORRECTION

PATENT NO. : 10,571,774 B2
APPLICATION NO. : 16/296481
DATED : February 25, 2020
INVENTOR(S) : Gary M. Graceffo et al.

Page 1 of 1

It is certified that error appears in the above-identified patent and that said Letters Patent is hereby corrected as shown below:

In the Specification

Column 8, Line 60, delete "MIRRORING" and insert -- MICRORING --.

Signed and Sealed this
Ninth Day of June, 2020

Andrei Iancu
*Director of the United States Patent and Trademark Office*